C. T. CHESTER.
Electric Battery.
No. 51,144.
Patented Nov. 28, 1865.
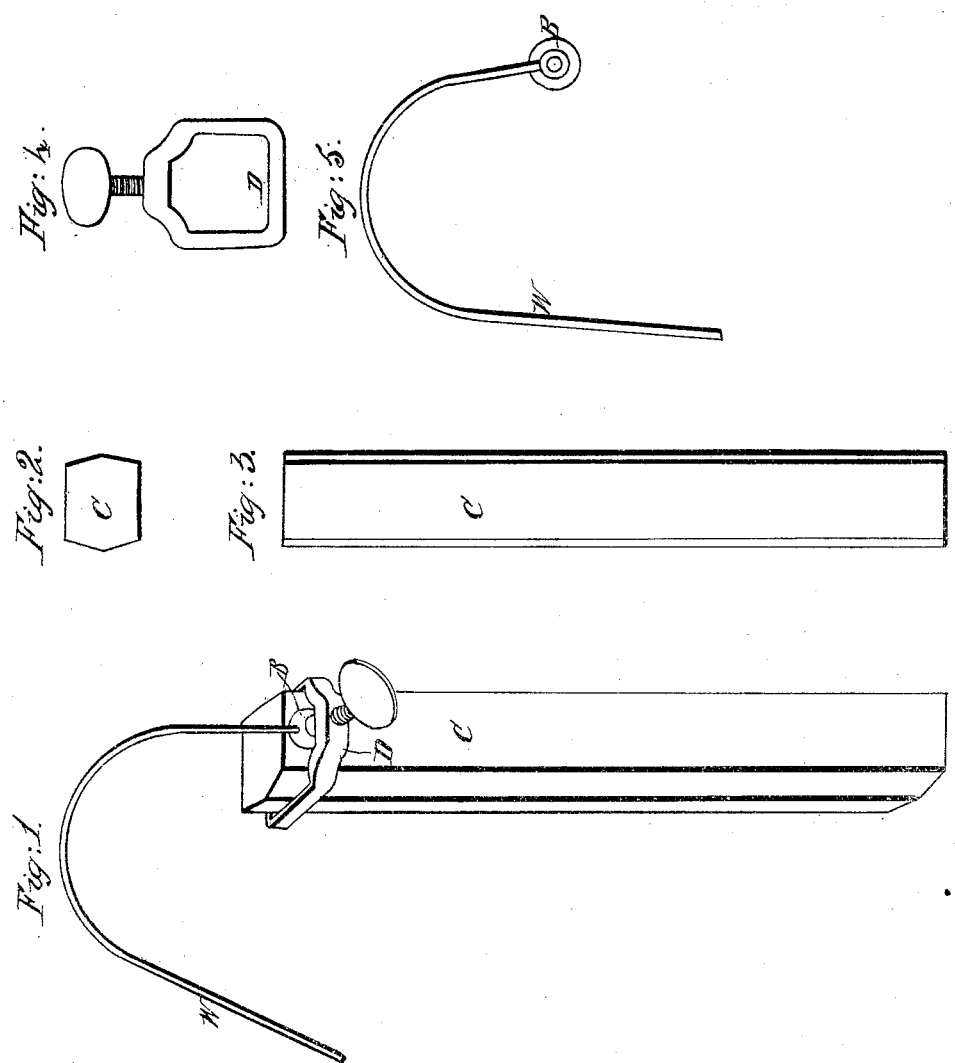

UNITED STATES PATENT OFFICE.

CHAS. T. CHESTER, OF HACKENSACK TOWNSHIP, BERGEN COUNTY, N. J.

IMPROVEMENT IN CONNECTORS FOR CARBON BATTERIES.

Specification forming part of Letters Patent No. 51,144, dated November 28, 1865.

*To all whom it may concern:*

Be it known that I, CHARLES T. CHESTER, of the township of Hackensack, county of Bergen, and State of New Jersey, have invented a new and Improved Method of making Electrical Connection with the Carbon Plates of Galvanic Batteries; and I do hereby declare that the following is a full and exact description of the said invention.

The design of my improvement is to effect a more reliable and easy passage of the electric current from the carbon plates of galvanic batteries to the zinc plates of the adjoining battery, or to the conductor that may carry the current to the point where it is to be used.

The connection of conductors to carbon plates has generally been effected by a clamp of metal which, by a screw, is made to press firmly against one surface of the carbon plate, or, by a conical wedge of metal forced into a corresponding cavity in the carbon plate. In each of these plans the metallic surface in contact rapidly becomes eaten or oxidized by the acid that creeps up through the porous carbon structure by capillary attraction. The inventor of this present improvement obtained a patent for embedding a piece of platina in the carbon plate in the process of manufacture, which formed, until mechanically broken, a perfect connection, and increased the use of carbons for batteries to a very great extent; but in large plates platina wires would be expensive if large enough to carry a very large quantitative current. It is therefore desirable often to have a large external connection with the carbon plates, which may also be easily detached for repair, and which shall also be free from corrosion or oxidation. To effect this the wire or strip connecting with the zinc of one battery has firmly fastened to one end a metallic plate or button, which plate or button is covered thoroughly with thick platina-foil which envelops its face and edges. In the case of a round button the platina is spun upon the face and over the edge. Any method may now be employed to press the button against the carbon—a clamp of brass, iron or rubber can be used, as it is only used as a mechanical presser, and no electricity passes through it.

In the accompanying drawings, Figure 1 represents the connection complete. A clamp, D, is used to press the button B, which has its face and edges protected by platina, against the carbon rod C, Figs. 2, 3, 4, and 5 representing the parts detached.

The excellence of this plan for connection is, that by its means the current passes direct from the platinated and always clean metallic surface of the conductor into the carbon element without the intervention of any other oxidizable conductor, and it amounts to the same thing if this be done by connecting a screw direct to the button and pressing by a nut against the carbon, so long as the main conductor, faced with platina, is pressed against the carbon surface.

Gold would answer to coat the exposed metallic surface of the conductor in place of platina, but its expense would make it less desirable.

The button on the side opposite the platina covering is formed with a central hole which receives the point of the thumb-screw which clamps the whole to the carbon plate. The screw thus readily finds the center of the button, and the platina surface is held evenly in contact with the carbon plate.

Having thus described my invention, the following is what I claim as new and desire to secure by Letters Patent:

1. Attaching the platina on the plate, button, or connecting-surface by spinning the platina onto and over the edge of the plate or button.

2. The application of a centering-hole on the opposite side of the plate or button, that the binding-screw may always find the center, and bring the platina surface firmly in contact with the carbon plate or its equivalent.

CHARLES T. CHESTER.

Witnesses:
JOHN SIDELL,
JOHN FARGIS.